United States Patent [19]

Yatsushiro et al.

[11] 3,857,053

[45] Dec. 24, 1974

[54] SYNCHRONOUS MOTOR STATOR POLE ARRANGEMENT

[75] Inventors: Kenji Yatsushiro, Chicago; George F. Kuchuris, Bloomingdale, both of Ill.

[73] Assignee: Controls Company of America, Schiller Park, Ill.

[22] Filed: Apr. 9, 1973

[21] Appl. No.: 348,916

[52] U.S. Cl. .................. 310/162, 310/41, 310/164
[51] Int. Cl. .................................. H02k 21/14
[58] Field of Search ............. 310/41, 156, 162–164, 310/257, 49 A

[56] References Cited
UNITED STATES PATENTS

| | | | |
|---|---|---|---|
| 2,289,495 | 7/1942 | Hansen et al. | 310/164 |
| 3,330,975 | 7/1967 | Osterwalder | 310/164 |
| 3,428,841 | 2/1969 | Bossard et al. | 310/164 |
| 3,746,900 | 7/1973 | Morley | 310/41 |

FOREIGN PATENTS OR APPLICATIONS

| | | | |
|---|---|---|---|
| 860,941 | 2/1961 | Great Britain | 310/164 |

*Primary Examiner*—Donovan F. Duggan
*Attorney, Agent, or Firm*—Michael, Best & Friedrich

[57] ABSTRACT

The gear case is formed with three stator poles circumferentially arranged about the motor axis and formed to lie on the same radius. These poles are equal in width and are equally spaced. The motor case is formed with three or six stator poles. With three motor case stator poles, each is about twice the width of and lies between the gear case poles so the working air gaps are unequal, thus developing an asymmetrical magnetic pattern assuring self starting. In the case of six motor case poles, they are the same width as and lie in pairs between the gear case poles so the working air gaps are unequal. In either case the working air gaps of equal width are spaced 120°. The motor coil is wound on a bobbin and mounted between the cases around the poles.

9 Claims, 4 Drawing Figures

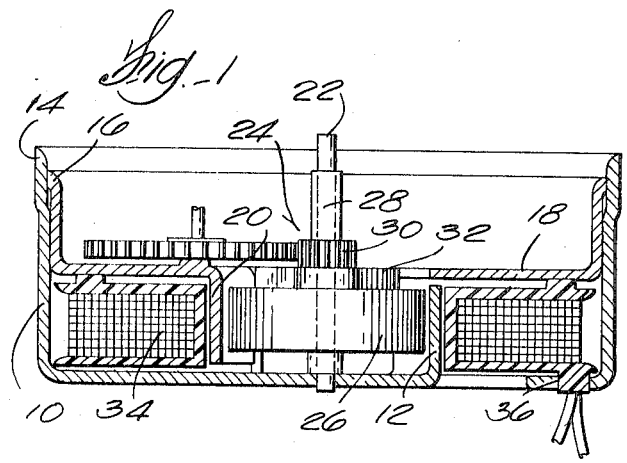
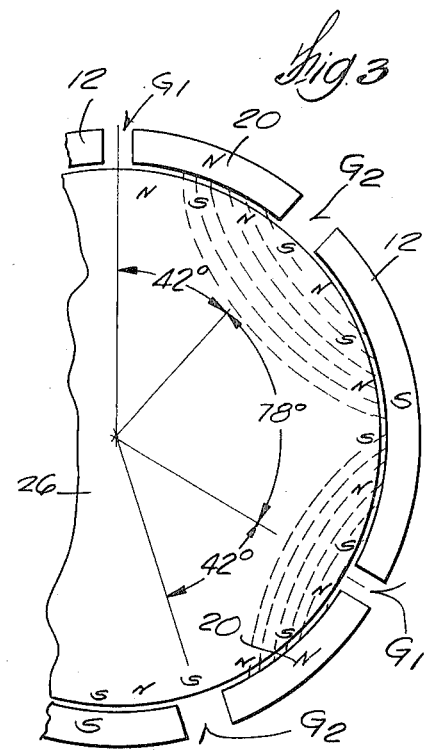
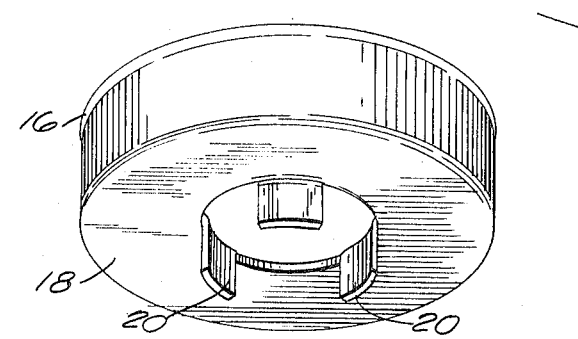
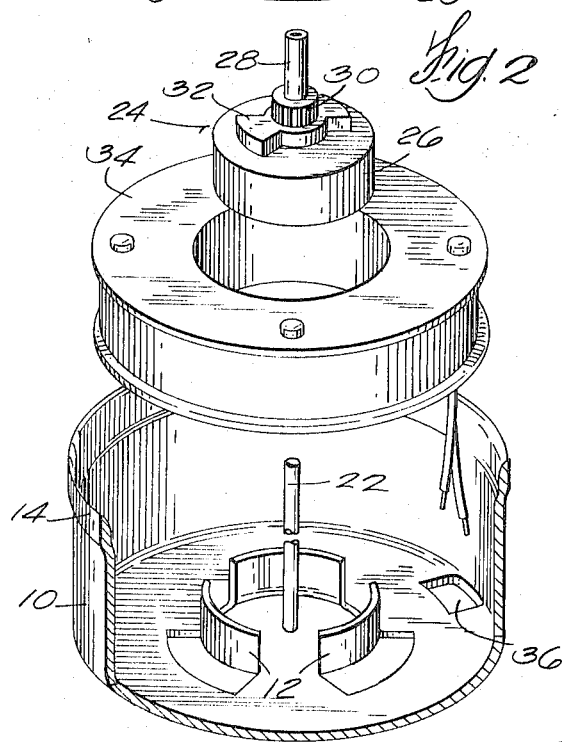
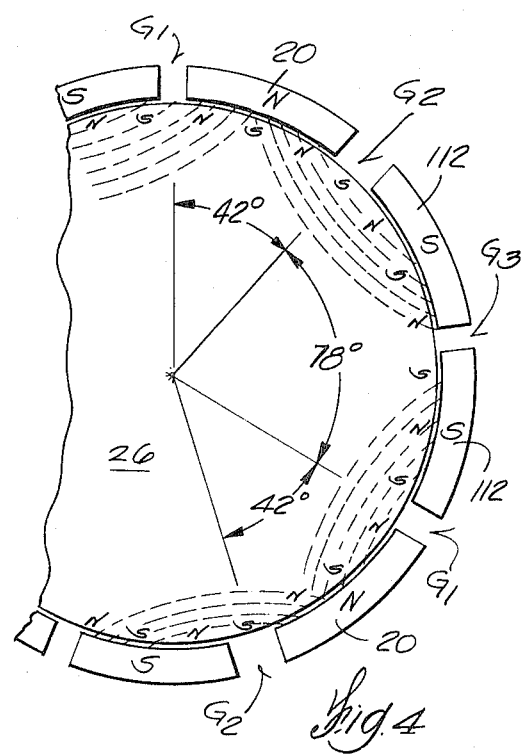

SYNCHRONOUS MOTOR STATOR POLE ARRANGEMENT

BACKGROUND OF THE INVENTION

It has long been recognized that permanent magnet synchronous motors must have an asymmetrical magnetic pattern in an effort to produce unbalanced forces to start rotation of the motor. There are many ways this has been achieved but many solutions reduce torque unacceptably.

Modern magnetic materials make it possible to reduce motor size if an acceptable stator pole arrangement can be worked out . . . . by acceptable it is meant that reducing the number of stator poles should not appreciably offset the gain in other design areas and thus negate the size reduction by resulting simply in a smaller motor having less torque.

SUMMARY OF THE INVENTION

This invention is directed to provision of a small, simple permanent magnet synchronous motor having good starting and running characteristics. The present construction (in either the 6 or 9-pole configuration) is characterized by having alternate working air gaps of unequal width and having working air gaps of equal width equally spaced (at 120°). A highly satisfactory motor is achieved with only six or nine poles.

This design is also characterized by the fact that poles of the same polarity are of the same width and have one half (or twice) the effective width of the poles of opposite polarity, thus creating unbalanced magnetic forces enhancing starting characteristics.

BRIEF DESCRIPTION OF THE DRAWINGS

FIG. 1 is a vertical cross section of a motor made according to the present invention.

FIG. 2 is an exploded view of one of the case parts being broken away to better show the orientation of the poles.

FIG. 3 is a diagram illustrating the arrangement of the 6-pole version of the present invention and has superimposed thereon the polarization pattern on the rotor and a partial illustration of the flux pattern between poles of opposite polarity.

FIG. 4 is the same as FIG. 3 but shows a 9-pole construction.

DESCRIPTION OF THE PREFERRED EMBODIMENTS

Motor case 10 has three poles 12 lanced from the bottom and turned inwardly to present arcuate faces concentric with the motor axis. The gear case 18 is pressed into and centered by the motor case. This functions to position the gear case relative to the motor case. The three poles 20 lanced and formed from the case. The three poles 20 lanced and formed from the gear case fit between poles 12 of the motor case. The three poles 20 are located 120° apart as are poles 12. Shaft 22 is pressed into the center of the motor case and serves to mount rotor assembly 24 comprising permanent magnet 26 mounted on a plastic member which includes a hub or sleeve 28, gear 30 and the wing-like member 32 which is part of the anti-reverse mechanism, the details of which are not shown and form no part of this invention. The rotor itself is quite small, the diameter being about 11/16 inch, and is magnetized to provide 30 poles equally spaced about the periphery of the rotor in alternate polarity. Thus the rotor poles are 12° apart.

The gear 30 projects into the interior of the gear case where it drives reduction gearing (not shown) to provide whatever output speed may be desired, the speed of gear 30 being 240 rpm at 60 Hz (3,600 ÷ 15) since there are 15 pairs of rotor poles.

Coil 34 is mounted between the gear case and motor case and surrounds the pole pieces with its leads brought out through hole 36 so the coil can be energized with 60 Hz current to thus induce the magnetic field in the pole pieces in the usual manner.

Referring now to FIG. 3, it will be noted that narrow poles 20 projecting into the motor housing from the gear case lie between wide poles 12 projecting from the motor case. Viewing FIG. 3 and going clockwise, a narrow pole piece 20 is separated from a large piece 12 by a gap $G_2$ which is greater than the gap $G_1$ separating the wide pole piece 12 from the next clockwise small pole piece 20. The relative size of gaps $G_1$ and $G_2$ may be reversed without affecting the operating characteristics. This pattern is repeated around the 6-pole arrangement. This pattern is superimposed on a portion of FIG. 3. Each pole 12 is approximately twice the width or effective area of each narrow pole piece 20. Due to greater flux density and depth associaed with a narrow pole, this arrangement produces unbalanced magnetic forces, which is a desirable situation in achieving the proper starting characteristics. Working air gaps $G_1$ and $G_2$ are unequal and, therefore, produce unbalanced amplitude or depth of magnetic forces to also enhance starting characteristics. Note that the gaps $G_1$ are located 120° apart and this is true also of the gaps $G_2$. The angular spans of the working air gaps embrace or circumscribe 42° and 78° which, with a 30-pole rotor, means they circumscribe, respectively, 3½ and 6½ rotor poles . . . again an unbalanced condition.

With this arrangement good starting characteristics are achieved while retaining good running characteristics, that is there is no appreciable offsetting of torque reduction militates against adoption of this design.

In the 9-pole arrangement shown diagrammatically in FIG. 4, in effect, each of the previous wide poles 12 is split to form two poles 112 lying between the poles 20 of the gear case. Each pole 112 is equal to the other and is also equal in width to each pole 20 projecting from the gear case. The gaps $G_2$ and $G_1$ remain as before and the gap $G_3$ now appears in the construction. Here again the relative size of gaps $G_1$ and $G_2$ may be reversed without affecting operating characteristics. This gap $G_3$, however, is not a working air gap as is evident from the partial depiction of the magnetic paths in FIG. 4. Gaps $G_2$ remain larger than gaps $G_1$. Gaps $G_2$ are 120° apart as are gaps $G_1$. The rotor pole embrace between working gaps remains as before since gaps $G_3$ are not working air gaps. The flux pattern remains substantially the same and performance is the same. The 9-pole version has some manufacturing appeal with respect to accurate formation of the smaller poles 112.

We claim:

1. A synchronous motor comprising
   a first case part having a group of poles lanced therefrom and formed to lie concentric with an axis,
   a second case part having a group of poles lanced therefrom and formed to lie concentric with said axis, said case parts being magnetically connected and defining with said poles an annular space,
a coil in said space and arranged to induce magnetic fields of alternating polarity in each of said groups when energized with alternating current,
the poles of one group being arranged relative to the poles of the other group so that alternate working air gaps are unequal and the air gaps of equal size are equally spaced,
and a rotor mounted for rotation on said axis and having a multiplicity of poles of alternate polarity on its periphery,
each stator pole embracing more than one rotor pole.

2. A synchronous motor according to claim 1 in which the poles of one group have about twice the total effective area as the poles of the other group.

3. A synchronous motor according to claim 2 in which the air gaps of equal size are spaced 120° apart.

4. A synchronous motor according to claim 3 in which each of the poles of one group circumscribes 3½ rotor poles and the poles of the other group lying between the spaced groupings of said one group circumscribe 6½ rotor poles.

5. A synchronous motor according to claim 4 in which there are three poles in each group.

6. a synchronous motor according to claim 4 in which there are three poles in one group and six poles in the other group.

7. A synchronous motor comprising a first cup-like case having a group of stator poles lanced therefrom and formed concentrically about an axis,
a second cup-like case nested within the first and having a group of stator poles lanced therefrom and formed to be concentric with the first group, the poles of one group being arranged relative to the poles of the other group so that alternate working air gaps are unequal and the air gaps of equal size are equally spaced about said axis,
a coil surrounding the stator poles between the case parts,
a rotor mounted for rotation on said axis and having a multiplicity of poles of alternate polarity on its periphery,
each stator pole embracing more than one rotor pole.

8. A synchronous motor according to claim 7 in which the total effective area of the poles of one group is about twice that of the other group.

9. A synchronous motor according to claim 8 in which working air gaps of the same same size are 120° apart and each group of poles in one group circumscribes 3½ rotor poles and each group of poles of the other group lying between the groups of poles of said one group circumscribes 6½ rotor poles and each group of poles of the other group lying between the groups of poles of said one group circumscribes 6½ rotor poles.

* * * * *

PO-1050
(5/69)

UNITED STATES PATENT OFFICE
CERTIFICATE OF CORRECTION

Patent No. 3,857,053        Dated December 24, 1974

Inventor(s) Kenji Yatsushiro and George F. Kuchuris

It is certified that error appears in the above-identified patent and that said Letters Patent are hereby corrected as shown below:

Column 4, claim 9, the last four lines, cancel "and each group of poles. . . circumscribes 6-1/2 rotor poles".

Signed and sealed this 15th day of April 1975.

(SEAL)
Attest:

RUTH C. MASON
Attesting Officer

C. MARSHALL DANN
Commissioner of Patents
and Trademarks